(12) United States Patent
Rohfleisch et al.

(10) Patent No.: US 8,345,584 B2
(45) Date of Patent: Jan. 1, 2013

(54) WIRELESS LOCAL AREA NETWORK AND ACCESS POINT FOR A WIRELESS LOCAL AREA NETWORK

(75) Inventors: Bernhard Rohfleisch, Wolfratshausen (DE); Charles Bry, Unterhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 983 days.

(21) Appl. No.: 11/861,289

(22) Filed: Sep. 26, 2007

(65) Prior Publication Data

US 2009/0080388 A1    Mar. 26, 2009

(51) Int. Cl.
*H04B 7/00*    (2006.01)
(52) U.S. Cl. .................... 370/310; 370/328; 370/338
(58) Field of Classification Search ............... 370/338, 370/412, 413, 438, 442, 447, 498, 912, 913, 370/310, 339; 455/3.01, 73, 78, 88, 426.2, 455/463, 500, 525, 432, 434, 435, 552.1, 455/562.1
See application file for complete search history.

(56) References Cited

U.S. PATENT DOCUMENTS

| | | | |
|---|---|---|---|
| 6,873,611 B2 | 3/2005 | Rios | |
| 7,787,416 B2 * | 8/2010 | Gidwani | 370/329 |
| 2004/0223476 A1 * | 11/2004 | Jose et al. | 370/338 |
| 2004/0264394 A1 * | 12/2004 | Ginzburg et al. | 370/310 |
| 2005/0124294 A1 * | 6/2005 | Wentink | 455/41.2 |
| 2007/0010237 A1 * | 1/2007 | Jones et al. | 455/422.1 |
| 2007/0049339 A1 | 3/2007 | Barak et al. | |
| 2008/0002692 A1 * | 1/2008 | Meylan et al. | 370/390 |

OTHER PUBLICATIONS

Prepared by the 802.11 Working Group of the 802 Committee Part 11: Wireless LAN Medium Access Control (MAC) and Physical Layer (PHY) specifications: Amendment 4: Enhancements for Higher Throughput IEEE P802.11n™/D3.00, Sep. 2007, pp. 9-10, 119-120, 125-135, 143-147 and 226,IEEE Xplore.
Sponsor LAN/MAN Standards Committee of the IEEE Computer Society Part 11: Wireless Lan Medium Access Control (MAC) and Physical Layer (PHY) specifications: Amendment : Radio Resource Measurement IEEE P802.11k™/D7.0, Jan. 2007, pp. 47-50, 59-60, 97-98, IEEE Xplore.
Sponsor LAN/MAN Committee of the IEEE Computer Society IEEE-SA Standards Board Part 11: Wireless LAN Medium Access Control (MAC) and Physical Layer (PHY) Specifications IEEE Std 802.11™-2007, Approved Mar. 8, 2007, pp. 11-12, IEEE Xplore.

* cited by examiner

*Primary Examiner* — Chi Pham
*Assistant Examiner* — Weibin Huang
(74) *Attorney, Agent, or Firm* — SpryIP, LLC (57) ABSTRACT

Embodiments related to Wireless Local Area Networks and access points for a Wireless Local Area Network are described and depicted.

18 Claims, 10 Drawing Sheets

Multiple BSS operation

*Fig. 5a*

Single BSS operation

*Fig. 5b*

Multiple BSS operation

*Fig. 5c*

Single BSS operation

WIRELESS LOCAL AREA NETWORK AND ACCESS POINT FOR A WIRELESS LOCAL AREA NETWORK

BACKGROUND

Wireless local area networks (WLANs) are becoming increasingly important in home, office or business applications as well as in other applications.

Various standards such as the IEEE 802.11 a/b/c/d/e/f/g/h/n standards have been established for WLANs in order to allow wireless network operation. According to the various standards, wireless communication may be established using spread spectrum modulation, OFDM (orthogonal frequency division modulation) or other modulation types. Typically, an infrastructure wireless network includes one access point or a plurality of access points to service wireless communication to one or a plurality of client stations. An access point or an access point device is an entity that provides for client stations wireless access to distribution services. An access point can for example be integrated or implemented in a gateway such as a DSL modem, a PON termination device, a router, a computer device or a cable modem to provide for example wireless connectivity with one or multiple devices including mobile devices such as laptops and personal digital assistants or stationary devices such as personal computers or consumer electronic devices at home. An access point may also be part of a structure comprising a plurality of access points which are interconnected using a wired or wireless distribution system to provide wireless communication coverage over a wider area for example in offices or buildings.

A basic service set (BSS) is a set of stations that communicate with each other. In an infrastructure basic service set, an access point builds the central communication point such that all communication is relayed through the access point. Stations that intend to join the basic service set have to be associated with the basic service set. Typically, for example in the IEEE 802.11 standards, association requires authentication.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may be assigned the same reference number.

In the following, various embodiments will be described wherein an access point services concurrently two or more basic service sets in a wireless local area network. The two or more basic service sets operate in different physical channels, i.e. use different frequencies for the RF transmission of data to the stations of a respective basic service set. As will be described later in more detail, the independent and concurrent operation of at least two basic service sets by one access point allows a flexible and dynamic configuration of the stations in the different basic service sets which may for example be used to optimize the data traffic to and from the various stations by the access point.

Figure 1:
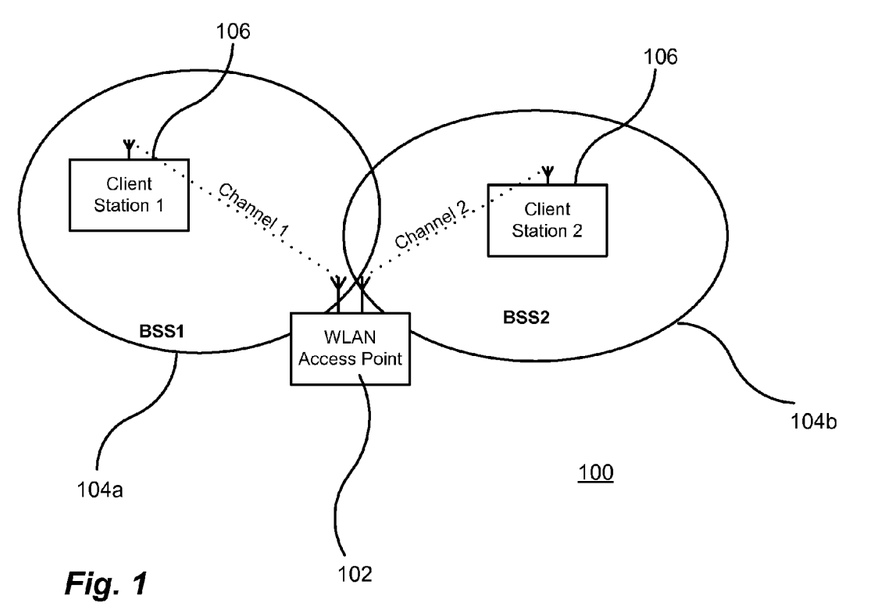
FIG. 1 shows a basic network arrangement according to embodiments of the present invention.

Referring now to FIG. 1, an exemplary WLAN network system 100 according to one embodiment includes an access point or access point device 102 serving a first basic service set 104a and a second basic service set 104b. The first and second basic service sets 104a and 104b each include at least one client station or client station device 106 assigned to the respective basic service set. The access point 102 serves the first and second basic service sets 104a and 104b concurrently and independently in different physical communication channels, i.e. the first and second channels used by the two service sets operate at different center frequencies such that the used frequency channels do not overlap. Thus, the access point is capable of simultaneously, i.e. at a same time instant, transmitting or receiving first data signals for the first basic service set over the first channel via an antenna or a plurality of antennas and transmitting or receiving second data signals for the second basic service set over the second channel via a another antenna or a plurality of other antennas. While FIG. 1 shows only one client station assigned to each of the basic service sets, it is to be understood that the first and second basic service sets 104a, 104b may include each a plurality of stations. The stations 106 may be any known stations including mobile devices such as laptops, mobile phones and personal digital assistants (PDAs) or stationary devices such as a personal computer or consumer electronic devices, for example a TV, a set top box (STB), an audio/video system etc. The various stations may have different transmission capabilities and may operate according to different standards. For example, in the first basic service set some of the stations may operate according to the IEEE 802.11n standard while other stations may operate in a legacy mode, for example according to the IEEE standards 802.11a, 802.11b or 802.11g.

It is to be noted that in FIG. 1 and other figures explained below, the assignment of the multiple client station in multiple BSSs as shown by an oval zoning, is only a logical assignment or affiliation and not a spatial partitioning. Or in other words, the first and second basic service sets 104a and 104b may cover a same area.

Furthermore, according to one embodiment the WLAN system 100 may comprise a plurality of access points to form an extended service set wherein at least one of the plurality of access points is an access point 102 as described above. The plurality of access points may be interconnected by a distribution system which may be wired or wireless. The plurality of access points may form an extended service set to cover a larger area and the distribution system may include Ethernet transmission capabilities.

As already mentioned, the access point 102 as shown in FIG. 1 is capable of servicing simultaneously multiple basic service sets. In order to allow the concurrent communication in the multiple basic service sets, the access point 102 comprises according to embodiments of the present invention multiple independent transmission/processing paths (MAC, PHY and RF chains). Thus, logically there are multiple MAC (medium access controller) paths, each capable of operating independently from the other MAC paths, and multiple PHY paths, each capable to be operated independently from the other PHY paths and multiple RF engines, each RF engine capable of providing and receiving RF radiation independent from the other RF engines. As is known to a person skilled in the art, the PHY is the lowest layer in the 7-layer OSI model and the MAC is the lowest sub-layer of the next higher data link layer.

Figure 2:
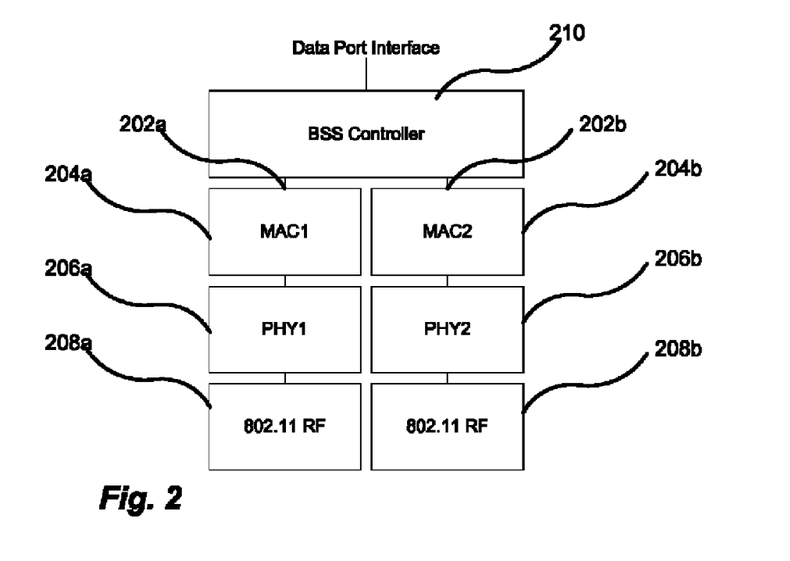
FIG. 2 shows a block diagram according to an embodiment of the present invention.

FIG. 2 shows an exemplary embodiment of an architecture which may be implemented in the access point 102. As can be seen, first and second transmission/processing paths (pipelines) 202a, 202b are provided, each of the paths including a MAC entity 204a, 204b, a PHY entity 206a, 206b coupled to the MAC entity 204a, 204b and an RF engine 208a, 208b coupled to the PHY entity 206a, 206b. A BSS controller entity 210 is coupled to both MAC entities 204a, 204b to perform controlling and management of the multiple basic service sets. If required, BSS controller entity may provide coordination of the multiple MAC entities and/or PHY and/or RF engines. As used herein, controlling provided by BSS controller entity is to be interpreted in a broad sense and may include managing functionalities for the different basic service sets such as assigning and dynamically reassigning stations to the multiple basic service sets serviced by the access point as well as bridging functionalities to control data transfer to one of the MAC entities 204a, 204b and controlling the operation mode of the MAC, PHY and RF engines for example controlling the physical transmission modes. For example, the BSS controller may control for each of the basic service sets the channel coordination functions and contention window parameters to be used, whether to use aggregation and/or block acknowledgements of frames, the channel width (20 or 40 MHz) to be used, or whether to use MIMO techniques. As will be appreciated by the skilled person in the art, the BSS controller entity 210 may be directly provided in the hierarchical layer model above the MAC. Some of the functions provided by the BSS controller entity 210 may be located at other hierarchical layers or may be provided by peripheral devices. The BSS controller entity 210 is coupled to a data port interface which may be a gateway interface, a distribution system interface, a backbone interface or the like. It is to be noted that the data port interface may be a single interface although logically two different basic service sets with two different logical data streams are provided.

The BSS controller entity 210 as well as the MAC entity 204a, 204b or the PHY entity 206a, 206b may be implemented in hardware, software, firmware or a combination of two or more of these. According to embodiments described below, the BSS controller entity and the MAC entity and/or the PHY entity may share common resources such as a processor (CPU). The BSS controller entity, the MAC entities and the PHY entities may be integrated on a single chip whereas the RF engines may be implemented on another chip. In other embodiments, the MAC entities and the PHY entities may be integrated on one chip whereas the BSS controller may be provided by another chip, for example a gateway chip.

Figure 3:
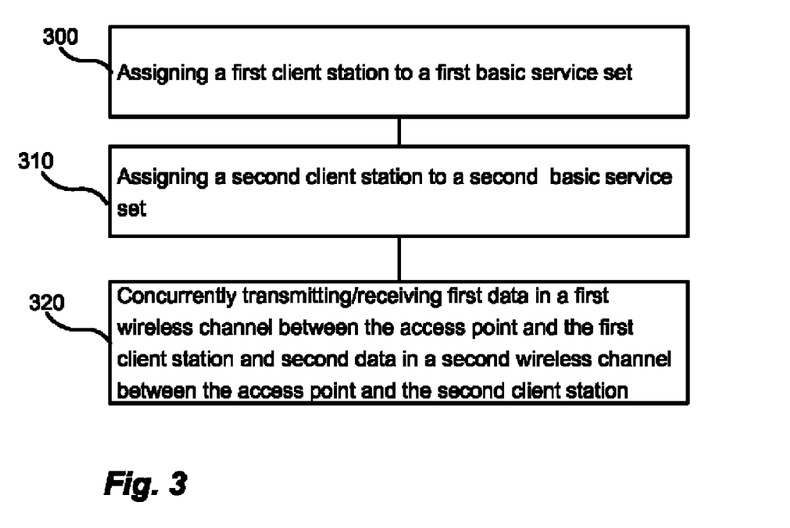
FIG. 3 shows an exemplary method according to an embodiment of the present invention.

An exemplary operation will now be described with respect to FIG. 3. Referring to FIG. 3, a first client station is assigned at block 300 to a first basic service set BSS1 serviced by the access point 102. At block 310, a second client station is assigned to a second basic service set BSS2. Assignment of the stations to the first and second basic service set may be based on specific criteria as will be outlined in more detail below. The assignment of the first and second client stations to the first and second basic service set may take place simultaneously or at different time instances. As described above, the assignment may be provided by the BSS controller entity 210 described with respect to FIG. 2. The assignment of the first and second client station may further be part of or may be provided during the association of the client station according to one of the IEEE 802.11 standards. As is known to a person skilled in the art, authentication or pre-authentication may take place prior to the association of a client station with the access point. Furthermore, prior to the assignment to a basic service set, a client station may have been assigned to another basic service set. For example, the second client station may have been assigned prior to the assignment to the second basic service set in the first basic service set. Further, both the first and second client stations may have been operated prior to the assignment to different basic service sets together in one single basic service set, for example the first basic service set. Authentication for a client station may be stored in a memory of the access point to improve performance when a station is assigned to another basic service serviced by the access point.

After the assignment of the first and second client station, the first and second basic service sets are serviced independently by the access point at 320 by concurrently transceiving (transmitting or receiving) first data in a first wireless channel between the access point and the first client station and second data in a second wireless channel between the access point and the second client station.

As described above, in the concurrent servicing mode which may be referred also as the multiple BSS mode, for each channel at least one antenna is provided for transceiving the RF signals in the respective channel. The first and second channel may be within a same frequency band, for example the 2.4 GHz band or the 5-5.8 GHz band. According to IEEE standards 802.11, the 2.4 GHz band ranging from 2.412 GHz to 2.462 GHz is separated into eleven channels. In other standards, for example ITU standards, the 2.4 GHz band from 2.412 to 2.472 GHz is divided in thirteen channels. From the available channels, two channels, for example channels 1 and 11 or 1 and 6 are selected for the first and second channel. Selection of the first and second channels may take into account a separation of the channels to avoid interference, for example the first and second channels may have a separation of at least 25 MHz which limits the number of channels available for the first and second channel.

In other embodiments, the first and second channels are selected from different bands. For example, one of the first and second channels is selected from the available frequency channels of the 2.4 GHz band while the other is selected from the available frequency channels of the 5 GHZ band. Selecting the first and second channels from different bands provides an extended frequency separation and may relax constraints in the RF processing due to closely located RF frequencies and resulting interference.

While in the above exemplary operation a first and second client station is assigned to a first and second basic service set, it is to be noted that more than one client stations may be assigned to the first and second basic service sets. Furthermore, more than two basic service sets may be serviced by the access point concurrently.

Assignment of the first and second stations and/or the other stations may be provided to improve or optimize the data communication for the plurality of client stations serviced by the access point and may be provided in a dynamic manner. For example, by assigning stations to different basic service sets, throughput, QoS (Quality of Service) or robustness of the wireless local area network may be improved or optimized. To this end, the assignment of the client stations to a basic service set may be provided based on the type of the data communicated by the station, the Quality of Service assigned to the data communicated by the station, the robustness of transmission expected for the data communication or a bandwidth (data throughput) required for the data communication of the station. The above criteria may be in accordance with services or service classes provided by the various standards. For example IEEE 802.11e/n classifies the data traffic into four access categories with different priorities for accessing the medium for transmission. Typically, the highest priority access category is dedicated to VoIP traffic which consumes low bandwidth but tolerates little delay of only up to 30 msec. A second highest priority is provided for video streams having a high bandwidth of up to 25 Mbps per stream but tolerable delays of up to 200 msec. The lower priority access categories are intended for non-real-time traffic, for example downloading of data files or browsing in the internet. In overload situations, for example when a high number of client stations are serviced in a basic service set or degrading channel conditions occur, the Quality of Service might not be met if the stations are serviced within a single basic service set. In these situations, the separation of the stations in different basic service sets provides improvement for each of the services as the assignment can be based on the specific requirements of the data traffic, such as high bandwidth or low latency etc. For example, the first basic service set might be operated according to IEEE 802.11n providing data transmission in spatial streams (MIMO) at a high bandwidth while the second basic service set operates with reduced bandwidth in legacy mode (802.11g or 802.11b) but with low latency.

Other criteria according to which the assignment can be provided may include the number of client stations assigned to the first basic service set and the second basic service set, the current data network traffic load in the first basic service set or the second basic service set or power saving requirements for a client station.

Figure 4A:
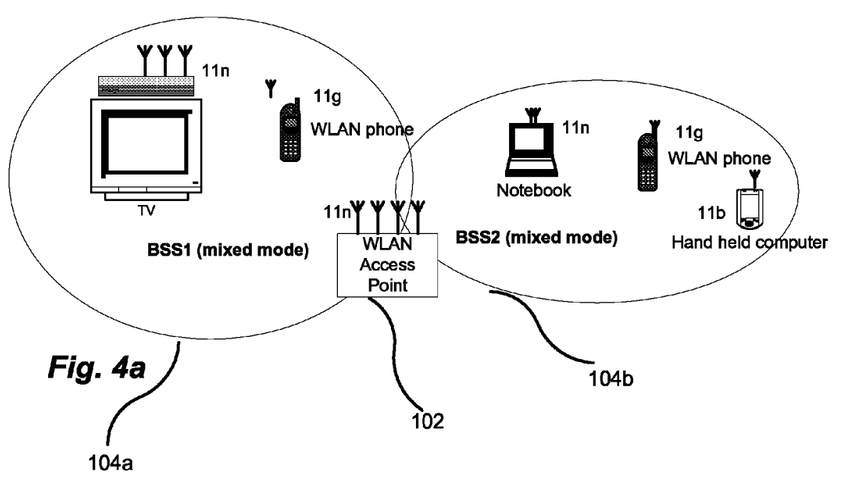
FIGS. 4a to 4b show an exemplary embodiment of the pre-sent invention.
Figure 4B:
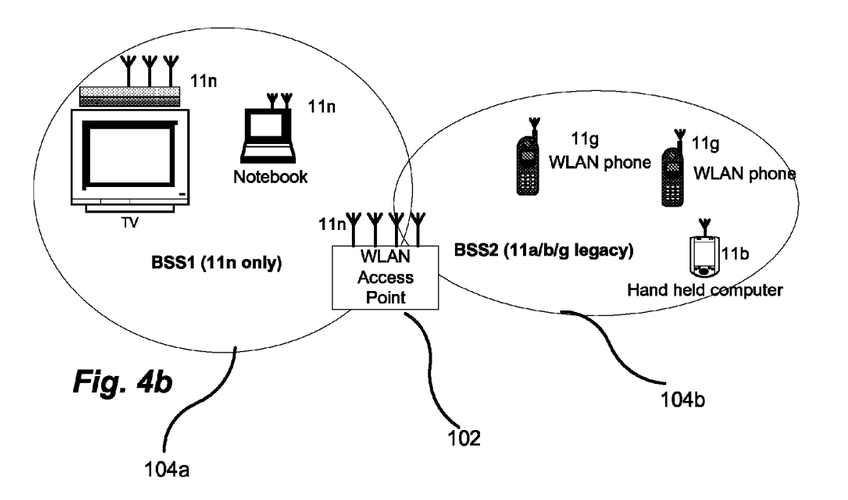

In one embodiment, the capabilities of the stations to operate in accordance with specific transmission or operation modes may be used as criteria for assigning the stations to the respective basic service sets. For example, the IEEE 802.11n standard provides for two transmission modes, a mixed transmission mode which allows support of legacy WLAN standards such as IEEE 802.11a or 802.11g and a Greenfield mode which is a "pure" 802.11n transmission mode without providing support of legacy WLAN standards. While the mixed mode uses a longer header and requires the use of protection mechanisms, for example RTS/CTS- or CTS-to-self sequences in order to be backwards compatible, the Greenfield mode can use a simplified header, does not require protection and can therefore provide higher data throughput. According to embodiments, both of the first and second first basic service sets may be provided in mixed mode supporting legacy devices in each of the basic service sets as shown in FIG. 4a. In other embodiments, one of the basic service sets, for example the first basic service set may be provided in a Greenfield mode while the second service set is operated in mixed mode providing the support for legacy stations as shown in FIG. 4b. Assignment of a station to the first basic service set may therefore be based on the capability of the client station to operate in a Greenfield mode, or in other words, on the capability to transmit according to IEEE 802.11n standard.

Furthermore, the assignment of the stations to the basic service sets may according to embodiments be based on a security protection required for the data communication of a given station.

It is further to be noted that the assignment may according to one embodiment be based on a combination of two or more of the criteria described above. Look-up tables or optimizing functions combined with monitoring of the data traffic may be used in order to determine a configuration for the stations in the different basic service sets best suited for the current situation. It is to be noted that the servicing of the two or more different basic service sets as described can be fully compliant with the existing WLAN standards like IEEE 802.11 standards. For example, in accordance with existing standards, each of the first and second basic service sets may be identified by a basic service set identifier (BSSID). The basic service set identifier may be linked to a MAC address provided by the manufacturer of the system/device which uniquely identifies the basic service set.

While the access point provides for each of the multiple basic service sets an independent MAC address (BSSID), the access point itself still appears outside of the WLAN, for example for the distribution system or a backbone system, as a single access point with a single interface for the data connection out of the WLAN. In order to forward data packets correctly to the MAC path corresponding to the basic service set of the station, the access point implements bridging functionality.

Figure 7A:
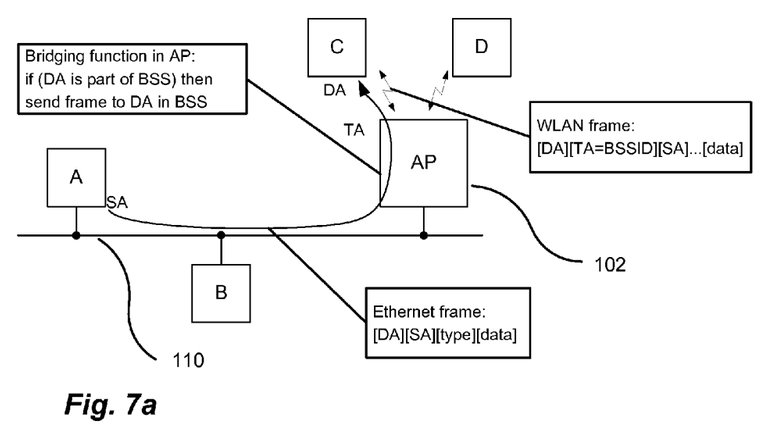
FIGS. 7a and 7b show exemplary data transmission for a single BSS operation.
Figure 7B:
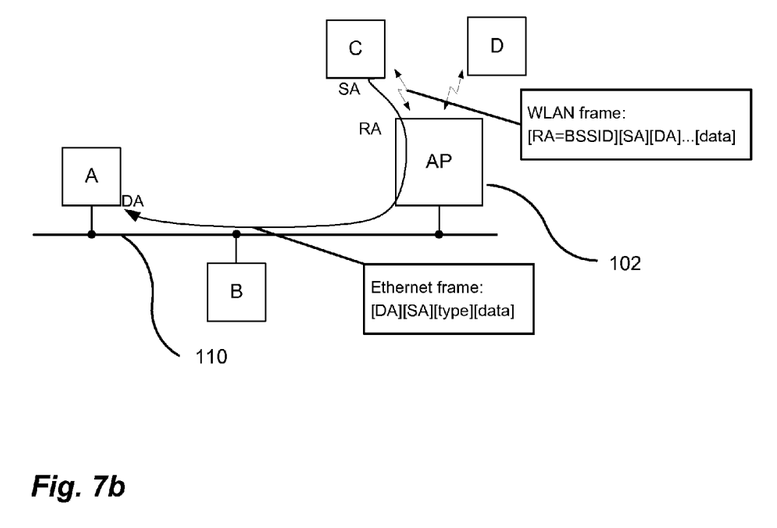

Bridging functionality may be provided in various ways. For example, according to one embodiment of an access point connected to an Ethernet distribution system, the access point receives all data packets transmitted on the Ethernet distribution system. The access point, i.e. the BSS controller entity of the access point, determines whether the destination address of the received data packet corresponds with the address of one of the stations assigned to the first or second basic service set. If the destination address matches the address of one of the stations, the data packet will be transferred to the MAC entity associated with the basic service set to which the station is assigned. FIGS. 7a and 7b show an exemplary bridging operation for a distribution system in the single BSS servicing mode. In FIG. 7a, a device A coupled to an Ethernet distribution system 110 sends data to a station C serviced by the access point 102. For transmission on the Ethernet distribution system, an Ethernet data packet is transmitted from device A to access point 102. The header of the Ethernet data packet transmitted from device A to the access point 102 includes the destination address DA which corresponds to the MAC address of the receiver station C and a source address which corresponds to the MAC address of the sender device A. At the access point 102, data packets transmitted on the distribution system 110 are analysed to determine whether the destination address matches one of the MAC addresses of the stations serviced by the access point 102. After determining that the destination address of the data packet matches the MAC address of station C, access point 102 generates a WLAN data packet by translating the Ethernet header to a WLAN header. In the WLAN header, in addition to the source and destination address, a transmitter address is included in the WLAN header which corresponds to the BSSID of the basic service set serviced by the access point 102. The split between source address and transmitter address is provided because the 802.11 MAC sends acknowledgments to the frame's transmitter (the access point), but replies are sent at higher layers to the frame's source.

In FIG. 7b, station C sends data to device A. Station C transmits a WLAN data packet comprising WLAN header data. In the WLAN header data, the destination address is indicated to be the address of device A and the source address SA is indicated to be the address of station C. Further, a receiver address RA is contained in the WLAN header. In the example of FIG. 7b, the station C is assigned to basic service set BSS1 and therefore the receiver address RA corresponds to the BSSID of basic service set BSS1. Access point 102 receives the WLAN data packet and generates an Ethernet packet by translating the WLAN header to an Ethernet header. As already described, the Ethernet header contains only source and destination address. The Ethernet packet is then transmitted over distribution system 110 to device A.

Figure 8A:
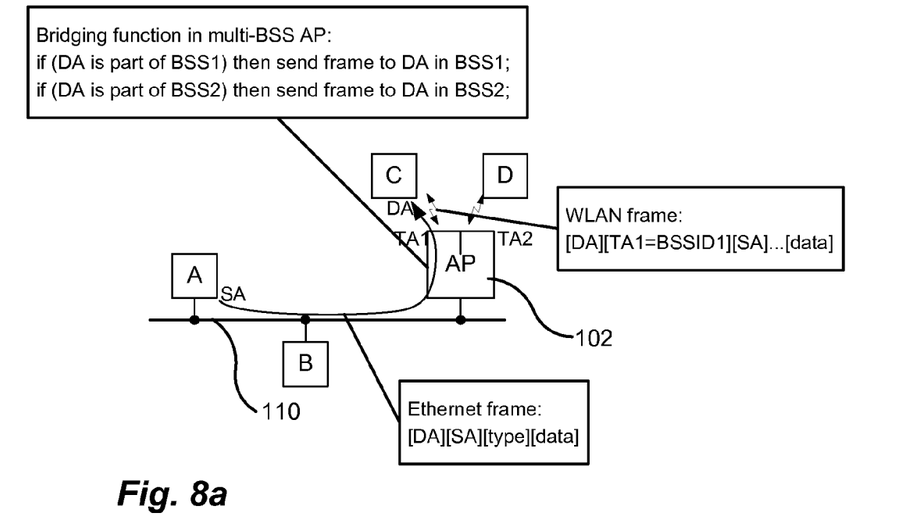
FIGS. 8a and 8b show exemplary data transmission for a multiple BSS operation.
Figure 8B:
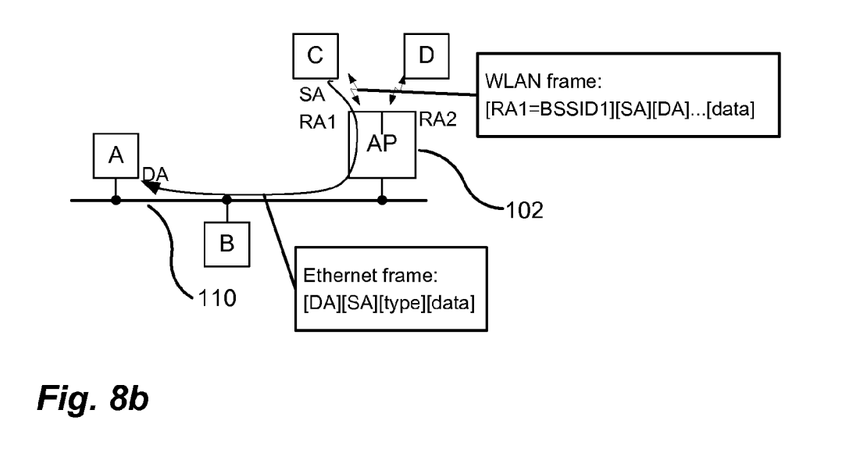

Referring now to FIGS. 8a and 8b an exemplary operation of the bridging functionality in a distribution system is shown when the access point 102 services multiple basic service sets. In the embodiment shown in FIGS. 8a and 8b, station C is assigned to the first basic service set BSS1 and station D is assigned to the second basic service set BSS2. When device A sends data to station C, device A transmits an Ethernet data packet including the source address of device A and the destination address of station C as already described with respect to FIG. 7a. Access point 102 then analyses the data packet to determine whether the destination address matches one of the addresses of the stations assigned to basic services sets BSS1 or BSS2. If the destination address matches one of the stations, a WLAN data packet is generated and transmitted to the stations via the basic service set to which the station is assigned. The WLAN data packet is generated by introducing into the WLAN header the transmitter address corresponding to the BSSID of the basic service set to which the station is assigned, i.e. the BSSID of BSS1 or BSS2. In the example, station C is assigned to basic service set BSS1 and therefore the transmitter address in the WLAN packet corresponds to the BSSID of the basic service set BSS1. Referring to FIG. 8b, in the reverse direction when station C sends data to device A, station C transmits a WLAN data packet to access point 102. The WLAN data packet comprises a WLAN header with a receiver address corresponding to the BSSID of basic service set BSS1. The access point 102 receives the WLAN data packet from station C and generates an Ethernet data packet. As described above, the Ethernet data packet comprises the address and destination address but not the BSSID of the basic service set. It will be noted by a person skilled in the art that the above operation corresponds to an extension of the bridging functionality into the wireless media. The MAC address of the access point itself will not appear in the Ethernet medium.

In another embodiment of an access point implemented in or connected to a gateway such as a DSL access gateway, the bridging functionality may be provided as described above or may be provided already in the gateway for example by implementing the BSS controller entity as driver software running on a processor (CPU) of the gateway. With this implementation, the decision in which basic service set a data packet is transmitted and therefore in which MAC path the data is further processed in the access point is decided at the gateway.

While the stations have been assigned to the basic service set, the wireless local area network may be dynamically reconfigured by the access point 102 taking into account changes in conditions of the wireless local area network such as traffic load, data type of data packets, the number of active stations etc.

The dynamic reconfiguration may include a reassigning of one or more stations to alternative basic service sets. According to embodiments, the reassigning may occur during normal data transmission operation. For example, the second client station may be reassigned to the first basic service set thereby increasing the number of stations assigned to the first basic service set and decreasing the number of stations assigned to the second basic service set. This reassignment may for example be provided when the first basic service set has available data transfer capacity while the second basic service set is near the data transfer capacity limit or for any other reasons.

Furthermore, reassignment may include switching from operating multiple basic service sets to operating a single basic service set. Here, the reassignment of the second client station to the first basic service set implies that the second basic service set is without any assigned client station. Then, the second MAC path and the second PHY path corresponding to the second basic service set may be deactivated and the access point services only a single basic service set. However, it is to be noted that the RF capacity, i.e. the RF engines and the RF antennas may be reused for spatial multiplexing or for increasing the number of spatial streams in spatial multiplexing in the servicing of a single basic service set. Thus, by adding the one or more antennas and RF engines provided for servicing the second basic service set in the multiple BSS mode, the number of spatial streams can be increased in the single BSS mode as will be further described.

Furthermore, dynamic reconfiguration of the wireless local area network may include a reconfiguration of the first and second channel provided for the first and second basic service set. For example, the widths of the frequency channels may be increased or switched to operation modes where a partial overlap of the frequency regions takes place. While in the concurrent transmission mode the first and second channels are non-overlapping allowing simultaneous transmission of RF signals for both basic service sets, in this new overlapping or coexistence mode the simultaneous transmission of the RF signals for both basic service sets would result in interferences between the basic service sets. Therefore, for better performance in the coexistence mode, the radiation of the RF signals may be coordinated. Coordination of the RF signal radiation may be provided in higher layers or higher levels of the hierarchy for example by utilizing the BSS controller entity to coordinate the processing of the data in the first and second MAC entity and/or in the first and second PHY entity.

Figure 9A:
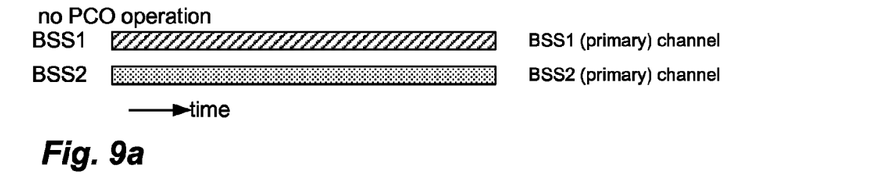
FIGS. 9a-9d show examples of coordination for two basic service sets.
Figure 9B:
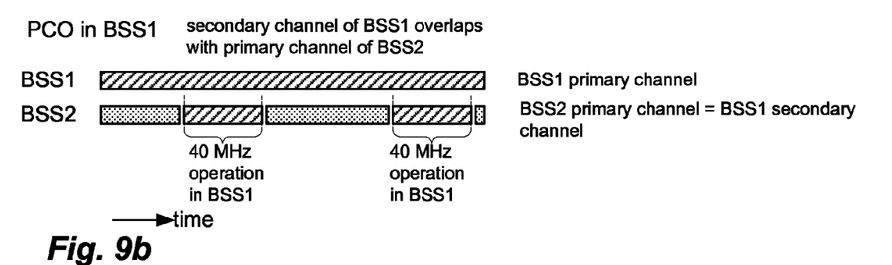
Figure 9C:
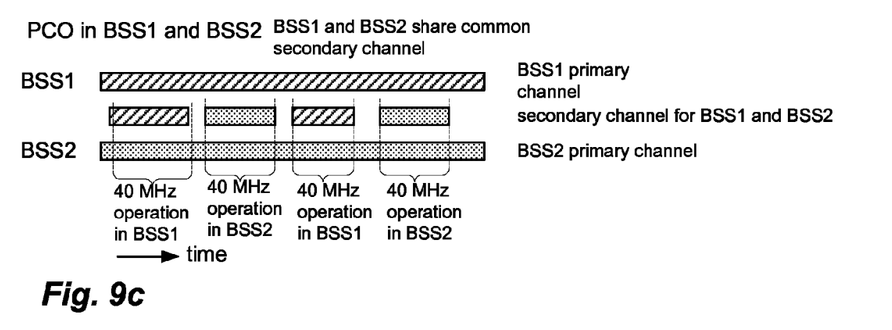
Figure 9D:
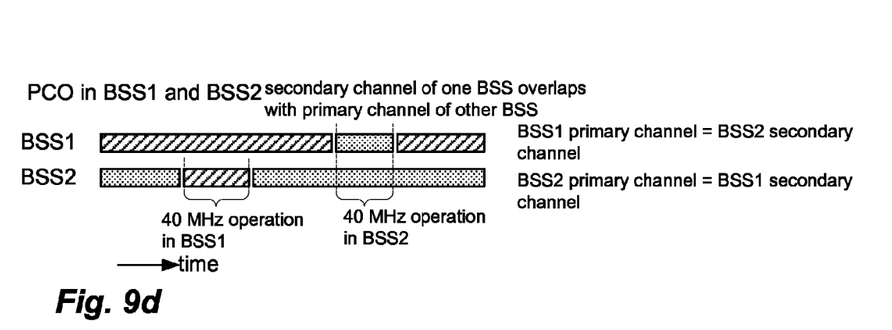

The dynamic reconfiguration may also include a switching to a transmission mode where two different transmission modes are alternating, for example, a phased coexistence operation (PCO) according to IEEE standard 802.11n. As described above, the BSS controlling entity may allow coordination of the two alternating transmission modes. For example, in the phased coexistence operation, the access point operates in two alternating phases. In the first phase, transmission is provided by a 20 MHz wide wireless channel (primary channel) and in the second phase, transmission is provided by a 40 MHz wide channel consisting of the primary channel and a second 20 MHz wide channel (secondary channel). According to one embodiment, which is illustrated in FIG. 9b, the first basic service set is operating in phased coexistence mode and the (primary) channel of the second basic service set is used as secondary channel for the first basic service set. The BSS controller entity may provide coordination between the two MAC entities when to apply the 40 MHz phases for the first basic service set, thereby it can avoid interference and increase overall throughput. In the embodiment illustrated in FIG. 9d, both of the basic service sets are operated in phased coexistence mode and the primary channel of one basic service set is used as secondary channel for the other basic service set, and vice versa. In this case the transmission may for example be coordinated such that a basic service set may switch to 40 MHz mode if no transmission is expected during that time in the other basic service set. In another embodiment shown in FIG. 9c, both of the basic service sets are operated in phased coexistence mode and both basic service sets share a common secondary channel. The transmission may for example be coordinated such that the two basic service sets are operated in the 40 MHz mode in a complementary way (out-of-phase) such that at a given time instance only one of the basic service sets is transmitting at 40 MHz channel width while the other basic service set is transmitting at 20 MHz. Operation without phased coexistence is shown in FIG. 9a.

It is to be noted that the operation of the access point as described above can be fully compliant with the existing standards. For example, the dynamic reassignment of the client stations may be provided by using a protocol described in the IEEE standard 802.11k, i.e. the access point can send a neighbor report in one basic service set which lists the other basic service set as an alternative, and force a client station to be reassigned by disassociating it from the current basic service set. This procedure is conform to existing standards. Furthermore, the access point can force a station to be reassigned to a new basic service set by disassociating the station from the present basic service set and thereby causing it to associate with the new basic service set by following procedures provided in existing standards.

As already described above, towards the data port interface, the access point can be regarded as a regular single access point. According to embodiments, the access point may be fully compliant with the standards IEEE 802.11a/b/g/n and may therefore be fully interoperable with devices operating according to these standards.

As will be apparent to a person skilled in the art, many ways of implementing the servicing of the multiple basic service sets and the architecture described in FIG. 2 are possible. Exemplary implementations utilizing MIMO (multiple input multiple outputs) spatial streaming will be discussed now with respect to FIGS. 5a to 5d, 6a and 6b.

Figure 5A:
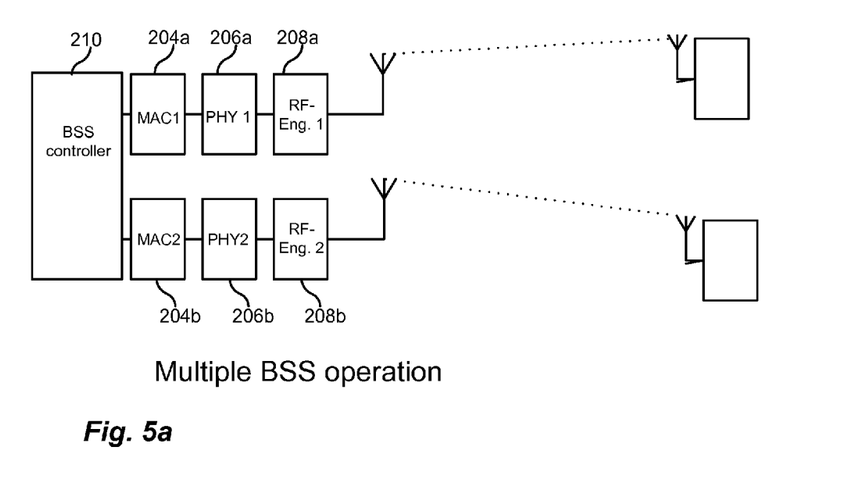
FIGS. 5a to 5d show exemplary embodiments of the present invention.
Figure 5B:
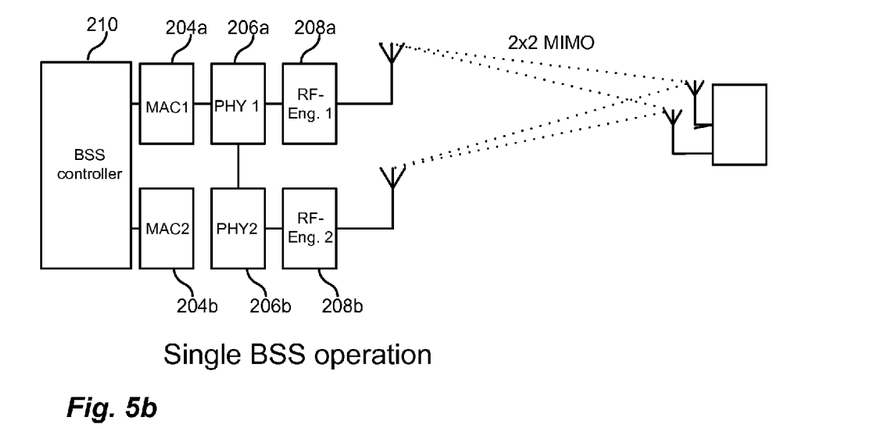

Referring to the embodiment according to FIG. 5a, the RF signals in the multiple BSS servicing mode are radiated by providing for each of the first and second basic service set a single RF antenna. Each of the two antennas is coupled via the RF engines in the multiple servicing mode to one of the PHY paths which is coupled to a corresponding MAC path as already described with respect to FIG. 2. As shown in FIG. 5b, the access point may then reconfigure the WLAN such that the access point services only a single basic service set. In the single BSS mode, the MAC entity corresponding to the second basic service set is deactivated as indicated by a grey color. The first and second antennas used in the multiple BSS mode to radiate signals to each of the basic service sets are then combined to provide a 2×2 MIMO spatial multiplexing. Note that the PHY entities are now operating together and provide one logical PHY in order to provide the stream parsing and spatial mapping for the two chains required for the 2 MIMO-operated antennas. It can be seen that the above examples provide an efficient usage of the resources as the separate PHY and RF engines can be used also for single BSS servicing in the MIMO spatial multiplexing operation.

Figure 5C:
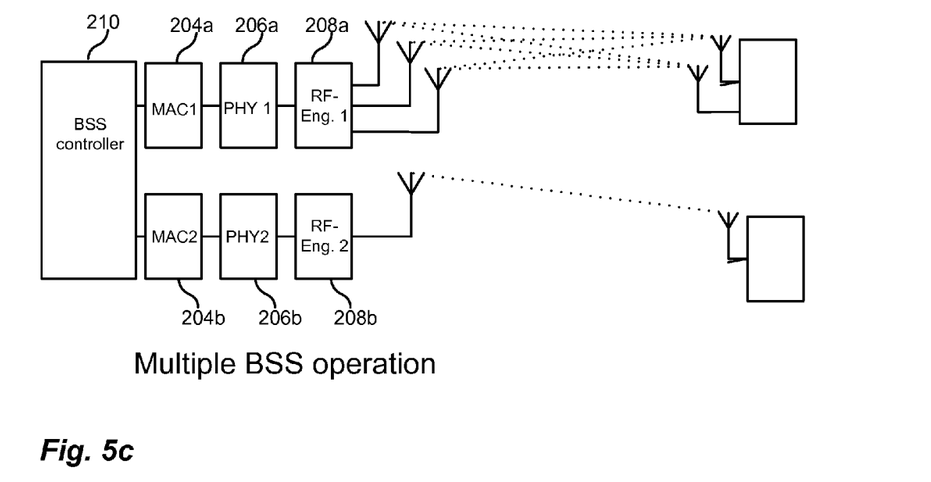
Figure 5D:
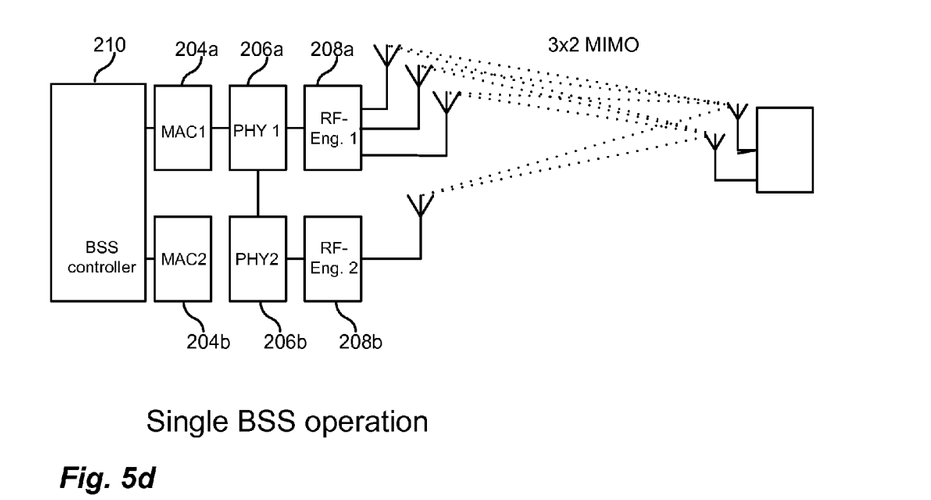

A further embodiment of a MIMO operation is shown in FIGS. 5c and 5d. In this embodiment, in the multiple BSS servicing operation, the first channel corresponding to the first basic service set operates in a MIMO operation with 3 antennas provided by the access point thereby forming a 3×n transmission network where n is the number of antennas at the receiving client station. For example, if the client station receiving data from the access point comprises 2 antennas as shown in FIG. 5c, a 3×2 MIMO communication system is formed in the direction from the access point to one of the client stations. For each of the antennas, a separate chain is provided in the RF engine and the baseband processing of the PHY entity as will be explained in more detail below.

Referring now to FIG. 5d, the WLAN is reconfigured for a single basic service set operation of the access point. The MAC entity corresponding to the second basic service set is deactivated and the second antenna is combined with the first antennas to provide a MIMO spatial multiplexing with 4 antennas. The PHY entities are combined in order to provide the stream parsing and spatial mapping of the four chains required for operating the four antennas in MIMO spatial multiplexing.

While the embodiment according to FIGS. 5c and 5d provides a MIMO operation with 3 antennas in the multiple BSS operation, it is to be understood that any integer number n1 (n1=2, 3, . . . ) of antennas can be used for the MIMO operation. Furthermore, it is to be noted that in the embodiment according to FIGS. 5c and 5d, also the second channel can be operated in the multiple BSS operation in MIMO spatial multiplexing with any number n2 of antennas. In the single BSS operation, the n2 antennas can then be added to provide a MIMO spatial multiplexing operation of up to N=n1+n2 antennas.

From the explanation of the above embodiments it becomes clear that an efficient utilization of the resources is provided as the separate PHY entities and RF engines can be used also for single BSS servicing in the MIMO spatial multiplexing operation.

A more detailed explanation of a baseband architecture corresponding to the embodiment shown in FIGS. 5c and 5d will now be given with reference to FIGS. 6a and 6b.

Figure 6A:
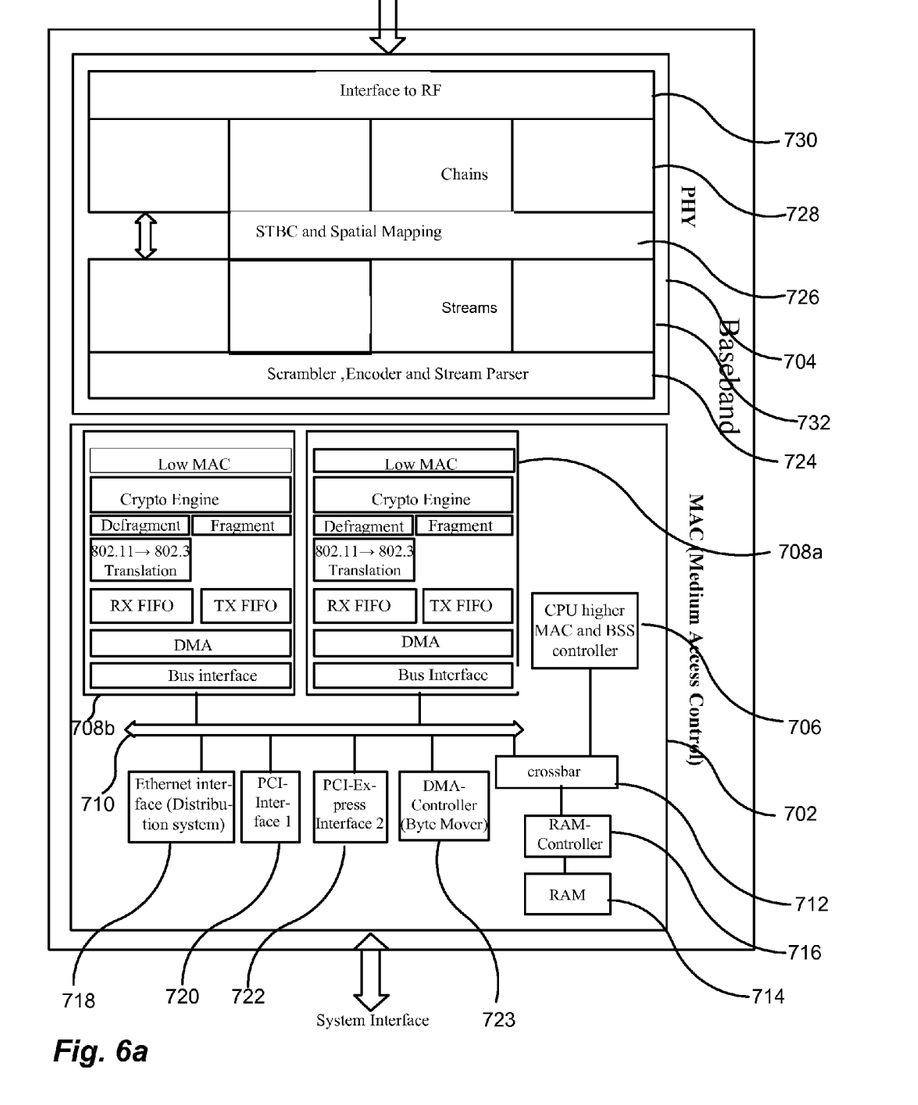
FIGS. 6a and 6b show block diagrams of an architecture according to exemplary embodiments of the present invention.

FIG. 6a shows a baseband architecture comprising a MAC block 702 and a PHY block 704. MAC block 702 and PHY block 704 may be implemented on a same chip or may be provided on different chips. The MAC implemented by MAC block 702 is divided into a Higher-MAC block for processing MAC operations on a higher hierarchical level which is implemented by running MAC software on a CPU 706 and a lower MAC block for processing MAC operations on a lower hierarchical level. The lower MAC block has two separate MAC instances 708a and 708b which are coupled to the CPU 706 via a bus 710 and a crossbar 712. Crossbar 712 further allows the CPU to have access to a RAM 714, for example a SRAM, via a RAM controller 716.

Interfaces for providing the system interface for various implementations of the access point are further coupled to the Bus 710. For example, as shown in FIG. 6a, an Ethernet interface 718 for allowing a system interface to a distribution system when the access point is implemented for example in an extended service set is provided. Other bus interfaces which may be used for providing a system interface for example when the access point is implemented in a gateway may include PCI or PCIexpress interfaces 720 and 722. In addition other peripheral devices such as a DMA (direct memory access) controller 723 may be coupled to the Bus 710.

In each of the lower MAC instances 708a and 708b, a Bus interface is provided to allow access to Bus 710. A direct memory access device (DMA device) and RX-FIFO (Receive-First-In-First-Out) and TX-FIFO (Transmit-First-In-First-Out) buffers are provided in each MAC instance 708a, 708b. In addition, functional blocks for address translation between WLAN (802.11) and Ethernet (802.3) and fragmentation/defragmentation are provided. In addition, each of the lower MAC instances 708a and 708b includes a crypto engine allowing cryptographic processing and a lower MAC block for providing other lower-MAC functionality.

The PHY block 704 comprises a scrambler, encoder and stream parser block 724 and a block 726 for providing STBC (Space time block coding) and/or beamforming and/or MIMO operation. Space time block coding is a technique used to improve data transmission by transmitting multiple copies of the data distributed over several antennas and over time.

Data from the MAC instances 708a and 708b are provided to block 724 for scrambling encoding and stream parsing. Four streams 732 are separated by block 724 and provided to four RF chains 728 to support up to four spatial MIMO streams and four antennas. To transmit the baseband signals to the RF engines for RF modulation a RF interface 730 is provided which may be a digital or an analog interface. It is to be noted that the assignment of the RF chains to the MAC instances is configurable to allow in the single BSS operation STBC and/or beamforming and/or MIMO techniques such as spatial expansion and direct mapping with up to four PHY chains and in the multiple BSS operation STBC and/or beamforming and/or MIMO techniques with up to three PHY chains. Another configuration may include a data communication in the multiple BSS operation where the first and the second channel each provide two antennas for one of the above techniques or a combination of the above techniques. In this case, the system is configured to assign two PHY chains to the first MAC instance and two PHY chains to the second MAC instance.

Figure 6B:
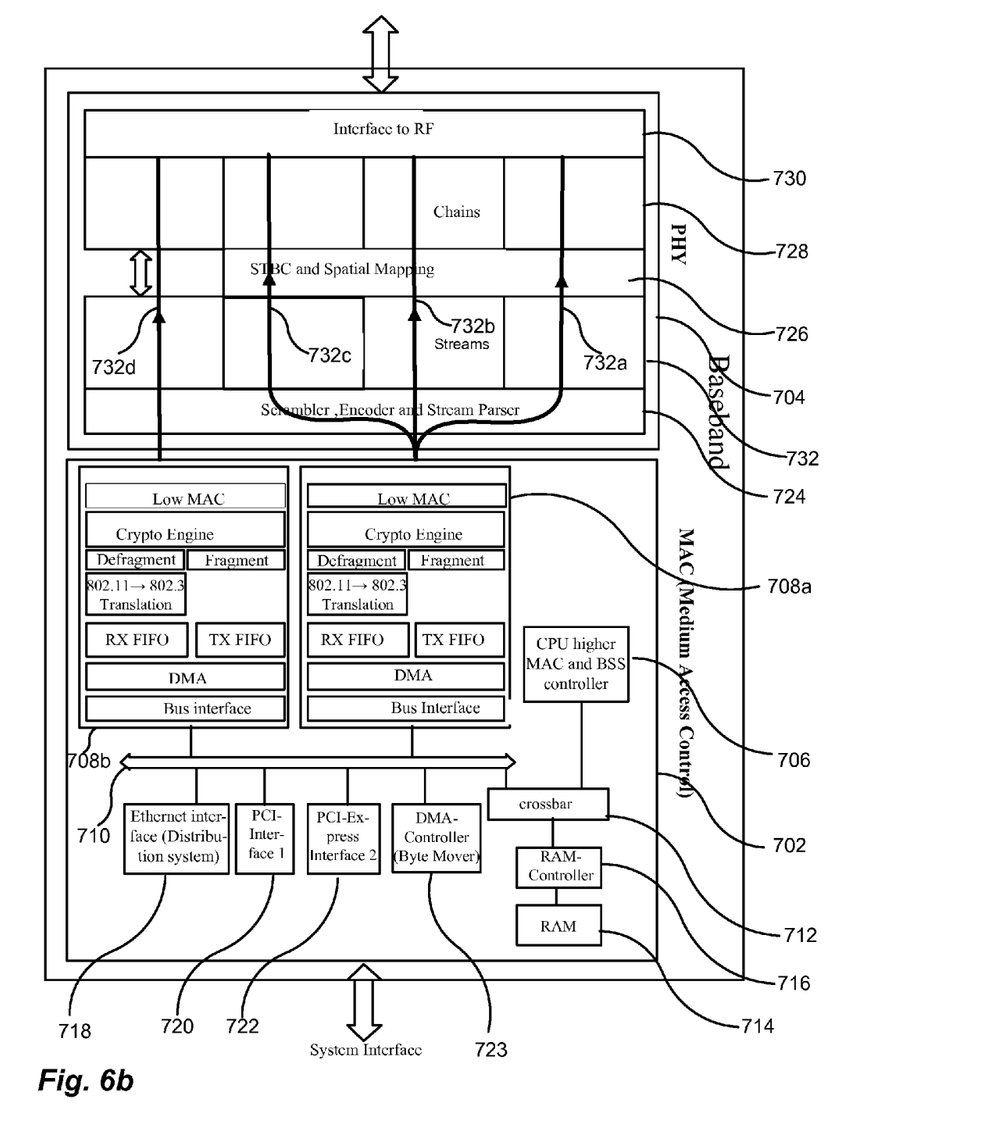

FIG. 6b shows data streams in the architecture of FIG. 6a in a multiple BSS operation corresponding to the operation shown in FIG. 5c. As can be seen, data from the first MAC instance 708a are separated into three streams 732a to 732c and provided to block 726 for space time block encoding and spatial multiplexing. Data from the second MAC instance 708b are provided in a fourth stream 732d which is transferred to the corresponding RF chain without processing in the STBC and spatial mapping block 726, as the second channel is not operating in spatial multiplexing operation.

It is to be noted that the BSS controller entity is implemented in this embodiment by running BSS controller software on the CPU 706. However, as described above, other implementations of the BSS controller entity in hardware, software or combinations thereof may be provided in other embodiments as has already been outlined above.

In the above description, embodiments have been shown and described herein enabling those skilled in the art in sufficient detail to practice the teachings disclosed herein. Other embodiments may be utilized and derived from this description, such that structural and logical substitutions and changes may be made without departing from the scope of this disclosure. For example, while in the embodiments two basic service sets serviced by the access point 102 have been described, it is to be understood that the access point 102 may service in other embodiments more than two basic service set concurrently by more than two wireless channels.

This detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those skilled in the art upon reviewing the above description.

It is further to be noted that specific terms used in the description and claims may be interpreted in a very broad sense. For example the term "data" may be interpreted to include every form of representing the data, such as an encrypted form of the data, an analog or digital representation, a modulated signal representing the data etc. Furthermore, the terms "circuit" or "circuitry" used herein are to be interpreted in a sense not only including hardware but also software, firmware or any combinations thereof. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    assigning a first client station to a first basic service set serviced by an access point in a wireless local access network (WLAN), the first basic service set configured to support a mix of contemporary WLAN standards and legacy WLAN standards;
    assigning a second client station to a second basic service set serviced by the access point, the second basic service set configured to support only contemporary WLAN standards and to operate at a greater data throughput than the first basic service set;
    concurrently transceiving first data in a first wireless channel between the access point and the first client station and second data in a second wireless channel between the access point and the second client station,
        wherein concurrently transceiving the first and second data comprises:
            processing the first data in a first medium access controller (MAC) entity of the access point and processing the second data in a second MAC entity of the access point, and
            transferring the first data to at least one first radio frequency (RF) chain and transferring the second data to at least one second RF chain.

2. The method according to claim 1, wherein the first and second wireless channels are non-overlapping.

3. The method according to claim 1, wherein transceiving the first data comprises using a multiple input, multiple output (MIMO) technique and/or a space time block coding (STBC) technique and/or a beamforming technique.

4. The method according to claim 1, further comprising reassigning the second client station to the first basic service set and, after reassigning the second client station, transceiving the second data in the first channel to the second client station.

5. The method according to claim 1, further comprising reassigning the second client station to the first basic service set,
wherein transceiving the first and second data in the first channel after reassigning the second client station comprises transferring the first and second data to the plurality of first chains and the second RF chain for transmitting the first and second data using a MIMO technique and/or a STBC technique and/or a beamforming technique.

6. The method according to claim 1, further comprising switching to a coexistence transceiving mode, wherein in the coexistence transceiving mode the first and second wireless channels at least partly overlap, wherein transceiving the first and second data in the coexistence transceiving mode comprises coordinating the processing of the first data by the first MAC entity with the processing of the second data by the second MAC entity.

7. The method according to claim 1, wherein assigning the first client station comprises selecting the first basic service set from the group comprising at least the first and second basic service set based on at least one of
a data type of the first data,
a Quality of Service assigned to the first data, interference and noise level on the first basic service set and/or the second basic service set,
a predetermined robustness of transmission for the first data,
a bandwidth required for the transmission of the first data,
a predetermined security protection for the first data,
a capability of the first client service to operate in a Greenfield mode,
the number of client stations assigned to the first basic service set and/or the second basic service set,
the current data network traffic load in the first basic service set and/or the second basic service set,
power saving requirements for the first client station, and
a latency assigned to the first data.

8. A wireless local area network (WLAN) access point device comprising:
a transceiver to simultaneously transceive
first data over a first wireless channel to a station associated with a first basic service set, the first basic service set configured to support a mix of contemporary WLAN standards and legacy WLAN standards, and second data over a second wireless channel to a station associated with a second basic service set, the second basic service set configured to support only contemporary WLAN standards and to operate at a greater data throughput than the first basic service set;
a first MAC entity to process the first data and a second MAC entity to process the second data; and
one or more first RF chains, the one or more first RF chains being coupled to the first MAC entity and one or more second RF chains, the one or more second RF chains being coupled to the second MAC entity.

9. The WLAN access point device according to claim 8, further comprising an entity coupled to the one or more first RF chains, the entity being controllable to process in a first operation mode only the first data according to MIMO and/or STBC and/or beamforming techniques and to process in a second operation mode the first and the second data according to MIMO and/or STBC and/or beamforming techniques.

10. The WLAN access point device according to claim 8, further comprising a controller entity to control the data traffic to the first and second MAC entities, wherein the controller entity is configured to assign a first station to a first basic service set and a second station to a second basic service set.

11. The WLAN access point device according to claim 10, wherein the controller entity is further configured to reassign the second station to the first basic service set and to control the transceiver to transceive the second data over the first wireless channel.

12. The WLAN access point device according to claim 10, wherein the controller entity is further configured to coordinate processing of the first data by the first MAC entity with the processing of the second data by the second MAC entity.

13. A wireless local access network (WLAN) communication device, comprising:
a first port to receive data traffic comprising first and second data;
a first MAC circuitry to process the first data, the first MAC circuitry configured to support a mix of contemporary WLAN standards and legacy WLAN standards;
a second MAC circuitry to process the second data, the second MAC circuitry configured to support only contemporary WLAN standards;
a controller entity to control concurrent transferring of the first data to the first MAC circuitry and transferring of the second data to the second MAC circuitry,
wherein the controller entity is further configured to assign a first client station to a first basic service set and to assign a second client station to a second basic service set, wherein the first data is associated with the first basic service set and the second data is associated with the second basic service set, and wherein the controller entity is further configured to transfer the first and second data based on the determined first and second basic service set, the second basic service set configured to operate at a greater data throughput than the first basic service set;
one or more first RF chains, the one or more first RF chains being coupled to the first MAC circuitry; and
a second RF chain, the second RF chain being coupled to the second MAC circuitry.

14. The WLAN communication device according to claim 13, further comprising an entity coupled to the one or more first RF chains, the entity being controllable to provide MIMO and/or STBC and/or beamforming processing in a first operation mode only for the first data and to provide MIMO and/or STBC and/or beamforming processing in a second operation mode for the first and the second data.

15. The WLAN communication device according to claim 13, wherein the controller entity is further configured to reassign the second station to the first basic service set and to transfer the second data to the first MAC circuitry.

16. The WLAN communication device according to claim 13, wherein the controller entity is further configured to coordinate processing of the first data by the first MAC circuitry with the processing of the second data by the second MAC circuitry.

17. A wireless local access network (WLAN) system, comprising
an access point; and
a first WLAN basic service set providing data transfer in a first wireless channel and a second WLAN basic service set providing data transfer in a second wireless channel, wherein the first and second WLAN basic service sets are serviced by the access point concurrently and independent from the respective other WLAN basic service set, wherein the access point comprises a first MAC entity to process first data transferred over the first wireless channel and a second MAC entity to process second data transferred over the second wireless channel and wherein the first basic service set is configured to support a mix of contemporary WLAN standards and legacy WLAN standards and the second basic service set is configured to support only contemporary WLAN standards and to operate at a greater data throughput than the first basic service set.

18. The WLAN system according to claim 17, wherein the access point further comprises a controller entity to control the first and second MAC entities, wherein the controller entity is configured to assign and reassign client stations to the first or second basic service set.

* * * * *